May 23, 1933.   M. M. GUGGENHEIM   1,910,536
SUGAR SANDING MACHINE
Filed Jan. 12, 1931
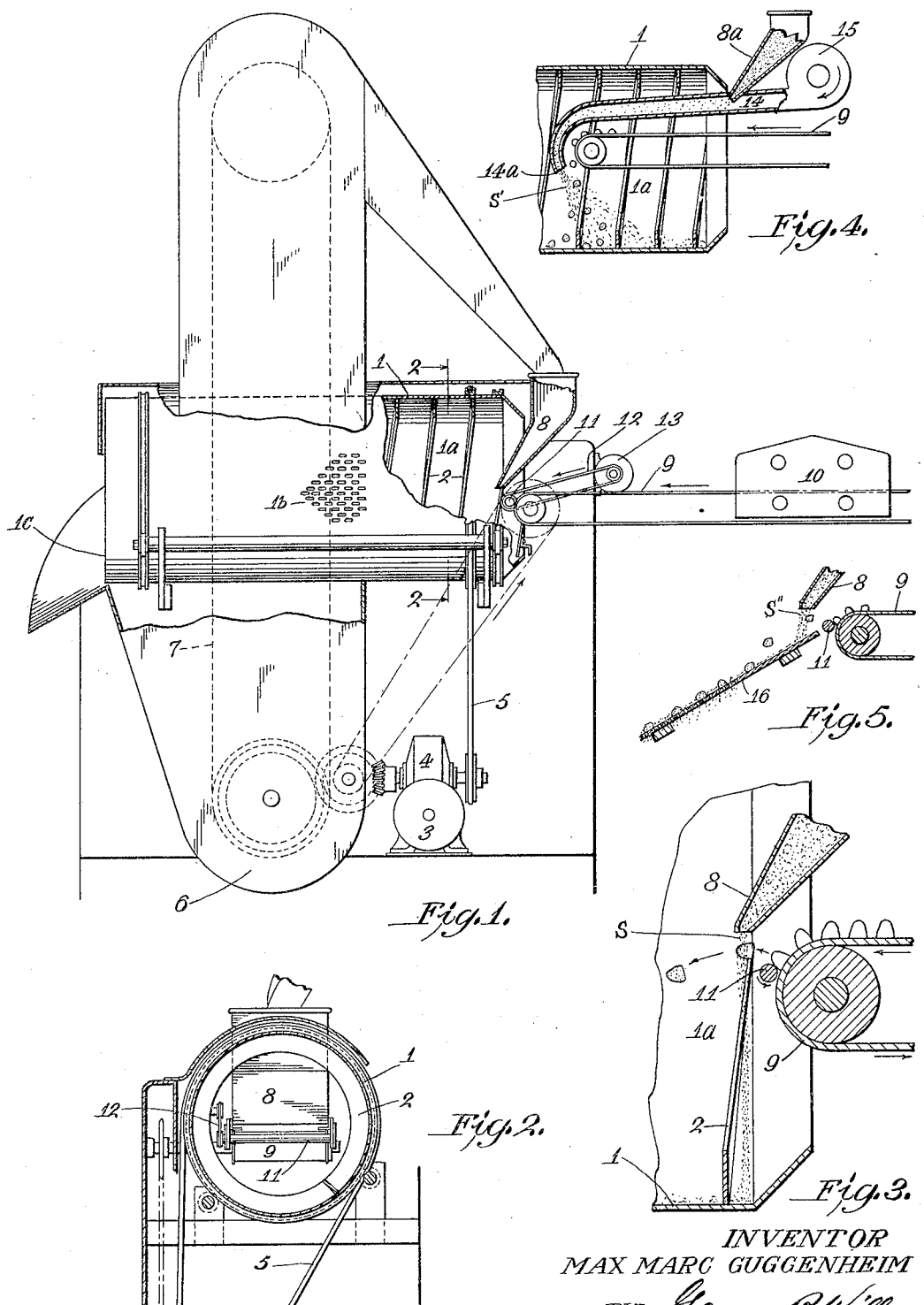
INVENTOR
MAX MARC GUGGENHEIM
BY George B. Willcox
ATTORNEY Patented May 23, 1933

1,910,536

UNITED STATES PATENT OFFICE

MAX MARC GUGGENHEIM, OF SAGINAW, MICHIGAN, ASSIGNOR TO BAKER PERKINS COMPANY, INC., OF SAGINAW, MICHIGAN, A CORPORATION OF NEW YORK

SUGAR SANDING MACHINE

Application filed January 12, 1931. Serial No. 508,334.

This invention relates to machines for coating confections with sugar, commonly known as "sugar-sanding machines", used generally for the coating of gumdrops. As constructed heretofore these machines comprise a receptacle such as a horizontal rotatable cylinder in which the confections, previously made sticky by the action of a steam or hot-water spray, are mixed with sugar.

If gumdrops are fed into such a machine so rapidly that they fall upon others which have not as yet become coated with sugar, they will stick together and form a ball of scrap, which has to be re-cooked. To prevent this, gumdrops must be fed to the machine more slowly, necessarily limiting the hourly output of the machine.

My invention has for its object the provision of novel sugar-coating means which may be employed either by itself to completely coat the confections, or to partially coat them preliminary to final treatment in the mixing receptacle of any machine in use heretofore. By its use I have practically eliminated scrap and have greatly increased the rate at which confections can be sugar-coated over that of the previously available machines.

The invention consists essentially in the combination of means for producing a curtain or stream of sugar together with means for projecting or dropping the uncoated confections into the curtain of sugar at a point substantially elevated from the surface of the receptacle or chute into which the pieces eventually fall. Thus the pieces travel through the air for a time sufficient to insure their becoming coated with sugar before they come in contact with other pieces which have preceded them.

Referring to the accompanying drawing, Fig. 1 is a part-sectional side elevation of a sugar-sanding machine embodying my invention.

Fig. 2 is a fragmentary cross-section of the machine taken at line 2—2 of Fig. 1.

Fig. 3 is an enlarged cross-sectional side view of the invention as shown in Fig. 1.

Fig. 4 is a longitudinal cross section taken at the feed end of the machine showing an alternative form of mechanism for effecting the pre-coating of the confections.

Fig. 5 is a sectional side elevation of my invention wherein the complete coating of the confection pieces is effected during their passage through the curtain of sugar.

One application of my invention is shown in Fig. 1. A sugar-sanding machine of known form comprises a horizontal mixing drum or cylinder 1, mounted for rotation about its axis. A helical blade 2 fastened to the inner wall of the drum serves to move the confections endwise of the cylinder while they are being coated. The wall of the cylinder is divided lengthwise into two zones 1a and 1b. Zone 1a, which includes the feed-in end, is imperforate, and here the confections are tumbled with the sugar. Zone 1b is perforated, to screen away the excess sugar which has not adhered to the pieces of candy.

The cylinder is driven by a motor 3 operating through a speed-reducing gear 4 and belt 5.

A conveyer belt 9 of known woven-wire construction carries the uncoated gumdrops past a moistener 10 which sprays them with steam or hot water to soften and render them sticky.

At the discharge end of the conveyor 9, close to its surface and positioned transversely thereto, is a rotatable element, preferably a rod or cylinder 11, arranged to be driven at a relatively high speed through a belt 12 by a motor 13. The rod 11 may be of any suitable diameter, depending upon the size and nature of the goods being handled. Small pieces, such as spice drops, require a thin rod, while a thicker rod serves best for large pieces. Although rod 11 has been shown in Fig. 3 as being located so as to engage the confections while they are on the belt, it is obvious that it can be located lower down so as to engage them after they have separated from the conveyor by gravity.

As the moist sticky pieces are carried by the conveyor to rod 11 they are engaged by it, removed from the conveyor, and thrown with some speed in a general horizontal direction into the mixing receptacle 1.

A supply of sugar is carried in a bin 6 which is located below the mixing drum 1 so as to catch the sugar which drops through the apertures of zone 1b of the drum. A bucket elevator 7 of known construction lifts the sugar from the bin 6 and discharges it into a hopper-like chute 8. Chute 8 at its outlet is as wide as conveyor 9 and extends into the drum 1, as shown in Figs. 1 and 3. Sugar flows from the outlet of chute 8 in the form of a ribbon or curtain S, extending transversely of the conveyor 9, as shown in Fig. 3. The confections that are thrown from the revolving cylinder 11 pass into this curtain and a coating of sugar adheres to their sticky surfaces.

The cylinder 11 provides a particularly effective means of removing any sticking pieces from the conveyor 9 without mutilating them, and if two or more pieces happen to be struck together on the belt 9, cylinder 11 will separate them and throw them individually through the stream of sugar.

In this instance the final part of the coating work is performed by tumbling in the revolving drum. While the drum revolves the pieces are advanced over the perforate section 1b, excess sugar sifts through into the bin 6, and the finished confections are discharged from the end 1c of the drum 1, in known manner.

Referring to the drawing, Fig. 4 shows an alternative form of my invention wherein an air blast projects the curtain of sugar in a direction inclined from the vertical. In this construction sugar flows from a chute 8a into a duct 14, which has its discharge opening positioned so as to direct the stream or curtain of sugar S' across the path described by the pieces as they fall from the end of the conveyor. The discharge opening 4a of chute 14 is approximately as wide as the conveyor 9, so that all of the pieces discharged from the conveyor must pass into the sugar-stream S'. A blower 15 drives the blast of air through the duct 14. This air blast entrains the sugar falling from the outlet of chute 8a and discharges it forcibly.

In this alternative form of my invention the pieces to be coated are not projected horizontally as they leave the conveyor 9, but merely drop therefrom by the action of gravity. If desired, a stationary scraper-blade (not shown) of known form may be placed close to the surface of the conveyor belt to dislodge any pieces that may stick to it.

By producing a sufficiently dense curtain of sugar it is possible to completely coat the confections without any further mixing with sugar in a receptacle. Either the curtain producing means shown in Figs. 1 and 3, or that shown in Fig. 4 may be employed for the purpose. In Fig. 5, I show my preferred means used in this manner. A dense curtain of sugar S'' flows from chute 8b, and the uncoated pieces are picked from the conveyor 9 and thrown into the curtain by the rotating element 11. Here they are coated and then they fall onto a perforated chute 16 which sifts out the excess sugar. Chute 16 may be vibrated by any suitable means (not shown), if desired.

The "sugar sanding" machine herein described, to which my invention has been applied offers the following advantages over those heretofore used:

By eliminating the sticking together of the confections in the mixing receptacle, the amount of scrap has been reduced to a fraction of one per cent. In prior machines of the same size the scrap amounted to as much as twenty per cent of the output. The only way in which the amount of scrap could be reduced was by reducing the rate at which uncoated pieces were fed to the machine, consequently restricting its output. Even when the speed was reduced some of the pieces would stick together and would have to be scrapped and recooked.

The improved machine can handle in a given time a much larger quantity of confections than was heretofore possible, since the sticking of the pieces to each other has been eliminated. Where one of the old machines could sugar eight hundred pounds of gumdrops per hour with twenty per cent of scrap, a machine of the same size, improved as herein described, produces twenty-two hundred pounds an hour with practically no scrap.

Having thus described my invention, what I claim and desire to secure by Letters Patent is:

1. In a machine for coating sticky confections with sugar or the like material, including a receptacle wherein the confections and sugar are mixed, in combination, a chute for introducing a descending curtain or stream of sugar into said receptacle, a conveyor for discharging uncoated confections into said receptacle, a rotatable element at the discharge end of said conveyor positioned to engage the confections carried thereon, means for driving said element at a relatively high surface speed, whereby said confections are thrown through said curtain and receive a preliminary coating of sugar before they touch other confections in said receptacle.

2. A machine for coating sticky confections with sugar comprising a chute for discharging a curtain or stream of sugar, a belt conveyor for uncoated confections having its discharge end close to said curtain of sugar, a rotatable element at the discharge end of said conveyor positioned to engage the confections carried thereon, and means for driving said element at a relatively high surface speed, whereby the confections are thrown into said curtain of sugar.

In testimony whereof, I affix my signature.

MAX MARC GUGGENHEIM.